May 24, 1927.
P. W. WIPPERMAN
1,629,941
BOOK RACK
Filed May 6, 1926
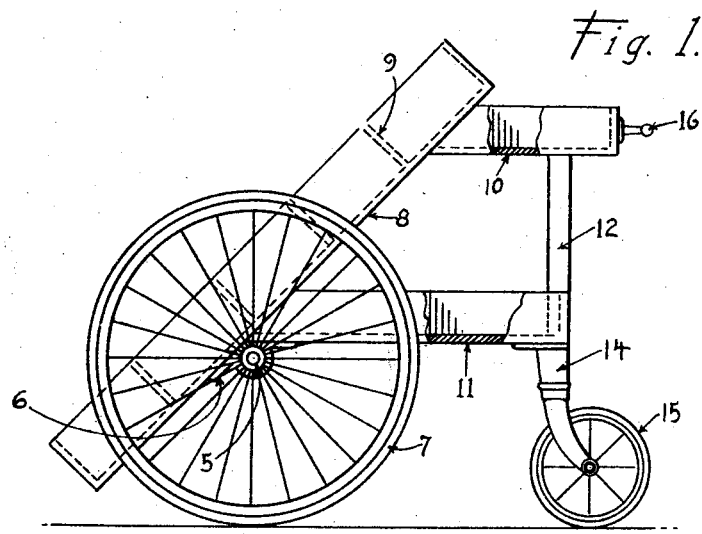
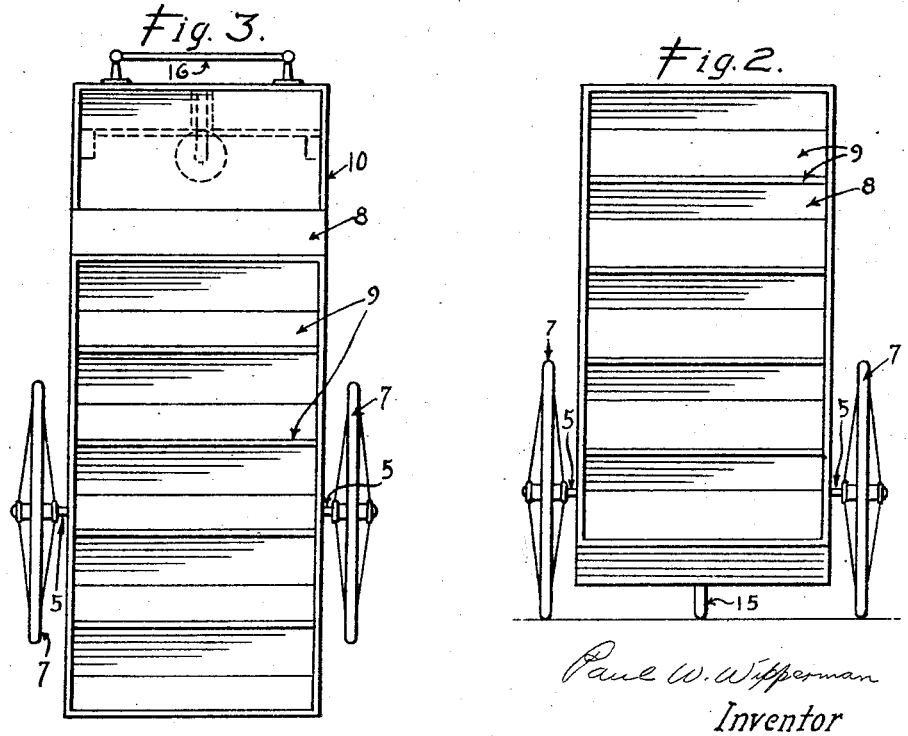
Paul W. Wipperman
Inventor Patented May 24, 1927.

1,629,941

UNITED STATES PATENT OFFICE.

PAUL W. WIPPERMAN, OF DECATUR, ILLINOIS.

BOOK RACK.

Application filed May 6, 1926. Serial No. 107,225.

This invention relates to a book rack, and has for its principal object to provide a wheeled structure which possesses superior compactness and convenience for use about the wards of a hospital in order that the rack may be wheeled through the ward so that access may be had thereto by the patients so that they may select whatever book they may desire from the rack.

Another very important object of the invention is to provide a structure of this nature which is exceedingly simple and inexpensive to manufacture, one which is strong and durable in construction, and efficient and reliable in use.

With the above and numerous other objects in view as will appear as the description proceeds, the invention resides in certain novel features of construction, and in the combination and arrangement of parts as will be hereinafter more fully described and claimed.

In the drawing:

Figure 1 is a sectional view of one side of the book rack embodying the features of my invention, Fig. 2 is a front elevation thereof, and Fig. 3 is a top plan view thereof.

Referring to the drawing in detail, it will be seen that 5 designates an axle in brackets 6 and having a pair of wheels 7 journaled thereon. A box-like structure 8 is fixed to the brackets 6 and inclines upwardly and rearwardly between the wheels 7. The box-like structure 8 is divided into a plurality of compartments by partitions 9, a pair of box-like structures 10 and 11 extending rearwardly from the box-like structure 8.

The structures 10 and 11 are disposed in spaced parallel relation and are extended from the structure 8 at oblique angles. A standard 12 is disposed between the structures 10 and 11. The structure 10 is located a slight distance below the upper end of the structure 8, while the structure 11 is located immediately above the axle 5. At the rear end of the structure 11 there depends the caster mounting 14 for the caster wheel 15. A handle bar 16 is mounted at the rear end of the structure 10.

From the above detailed description, it will be seen that I have provided an exceedingly compact and convenient book rack, particularly useful in hospital wards and like places for the convenience of bedridden patients and the like.

The present embodiment of the invention has been disclosed merely by way of example, since in actual practice it attains the features of advantage enumerated as desirable in the state of the invention and the above description. It will be apparent that numerous changes in the details of construction, and in the combination and arrangement of parts may be resorted to without departing from the spirit or scope of the invention as hereinafter claimed, or sacrificing any of its advantages.

Having thus described my invention, what I claim as new is:

A book rack of the class described, including an elongated inclined box-like structure, brackets on the box-like structure, an axle in the brackets, wheels on the axle, a second box-like structure extending rearwardly at an oblique angle from the first box-like structure, a third box-like structure extending rearwardly and at an oblique angle from the first box-like structure in parallelism with the second box-like structure, a standard between the second and third box-like structures, a caster wheel mounting depending from the third box-like structure, and a caster wheel thereon.

PAUL W. WIPPERMAN.